United States Patent [19]

Lake et al.

[11] Patent Number: 4,764,003

[45] Date of Patent: Aug. 16, 1988

[54] OPTICAL MIRROR COATED WITH ORGANIC SUPERCONDUCTING MATERIAL

[75] Inventors: John A. Lake; William B. Heath, both of Albuquerque, N. Mex.

[73] Assignee: The United States of America as represented by the Secretary of the Air Force, Washington, D.C.

[21] Appl. No.: 925,959

[22] Filed: Nov. 3, 1986

[51] Int. Cl.⁴ .......................... G02B 5/08; G02B 7/18; G02B 1/04; G02B 1/00

[52] U.S. Cl. .................................... 350/610; 350/600

[58] Field of Search ............... 350/610, 609, 600, 641, 350/642

[56] References Cited

U.S. PATENT DOCUMENTS

| | | | |
|---|---|---|---|
| 3,609,589 | 9/1971 | Hufnagel | 331/94.5 |
| 3,703,813 | 11/1972 | Olevitch et al. | 62/3 |
| 4,343,533 | 8/1982 | Currin et al. | 350/288 |
| 4,415,234 | 11/1983 | Meyers | 350/310 |
| 4,431,269 | 2/1984 | Barnes, Jr. | 350/310 |

*Primary Examiner*—Jon W. Henry
*Attorney, Agent, or Firm*—William G. Auton; Donald J. Singer

[57] ABSTRACT

An optical mirror has enhanced reflectivity and reduced thermal distortions when it is composed of a substrate coated with a reflective coating made of an organic superconducting material. The substrate is best constructed of materials which have the most favorable thermal expansion and thermal conduction characteristics at temperatures near 0° K. such as: silicon, diamond, copper and sapphire. The reflective coating is only a few microns thick and composed of organometallic compounds and is cooled to superconducting or cryogenic temperatures of less than 100° K.

8 Claims, 1 Drawing Sheet

OPTICAL MIRROR COATED WITH ORGANIC SUPERCONDUCTING MATERIAL

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to optical systems, and more particularly to a design for optical mirrors.

Optical systems, including modern lasers, commonly include mirrors among their optical components. Unfortunately, these mirrors are subject to thermal distortions and have reflectivities which are less than 100%. The task of reducing these thermal distortions and improving the reflectivities of optical mirrors is alleviated, to some extent, by the systems of the following U.S. Patents, the disclosures of which are incorporated by reference:

U.S. Pat. No. 3,609,589 issued to Hufnagel;
U.S. Pat. No. 3,703,813 issued to Olevitch et al;
U.S. Pat. No. 4,343,533 issued to Currin et al;
U.S. Pat. No. 4,415,234 issued to Meyers; and
U.S. Pat. No. 4,431,269 issued to Barnes, Jr.

Olevitch et al disclose an electrically conductive laser beam reflector that is cooled by a high voltage electrostatic field. The cooling effect of the electrostatic field has essentially the same distribution as the heating effect of the laser beam impinging on the reflector. The result is a reduction of different and varying temperature gradients in the reflector and the resulting distortions in the beam.

Barnes, Jr. is directed to a cooled laser mirror constructed with a substrate formed of a material having a thermal conductivity peak in a cryogenic temperature operating range. During operation the temperature of the substrate is maintained at cryogenic temperatures to insure peak thermal conductivity.

In Currin et al a solar radiation reflector is made using a laminate including cellulosic material and a curred polymer. In Hufnagel the coefficients of thermal expansion of bonded layers in a mirror construction are selected to balance out the tendency of the mirror to warp due to thermal gradients. Meyers uses heat-absorbing phase-change materials to provide passive cooling in a mirror.

All of the systems cited above are exemplary in the art, and indicate that there remains a need to reduce the thermal distortions in optical mirrors. The present invention is intended to help satisfy that need.

SUMMARY OF THE INVENTION

The present invention is an optical mirror whose design and materials of construction provide it with improved heat dissipation. This is accomplished by initially coating an appropriate optical mirror substrate material with a suitable organic superconducting material that will increase mirror reflectivity, and simultaneously decrease thermal distortions.

One embodiment of this optical mirror is produced when an adhering organic superconducting material having a material thickness in microns is placed over a substrate material having a thickness in centimeters. The invention increases the damage thresholds of optical mirrors and is directly applicable to weapons systems.

It is one object of the present invention to provide an optical mirror which has optical characteristics which are subject to a reduced amount of thermal distortions.

It is another object of the present invention to provide an optical mirror with increased mirror reflectivity.

It is another object of the present invention to increase the damage thresholds of optical systems by providing optical mirrors which have improved heat dissipation characteristics.

These objects together with other objects, features and advantages of the invention will become more readily apparent from the following detailed description when taken in conjunction with the accompanying drawings wherein like elements are given like reference numerals throughout.

DETAILED DESCRIPION OF THE PREFERRED EMBODIMENT

The present invention is an optical mirror which has a reflecting surface composed of an organic superconducting material for increased reflectivity and reduced thermal distortions.

Figure 1:
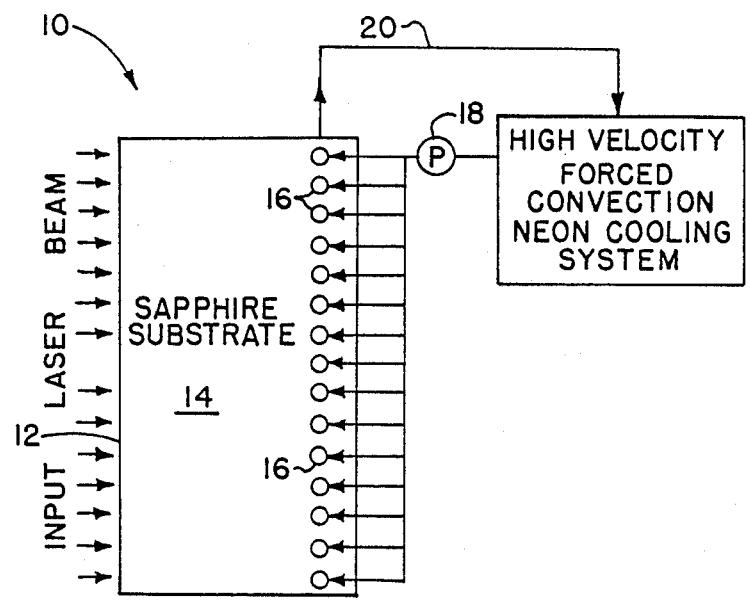
FIG. 1 is an illustration of a prior art low distortion optical mirror.

The reader's attention is now directed towards FIG. 1 which depicts the low distortion cooled mirror systems of the Barnes, Jr. reference. This prior art system relies on the cooling of an optical mirror 14 to cryogenic temperatures (less than 100° K.) to reduce distortions using a cryogenic refrigeration system 20.

Barnes, Jr. is a milestone in the art in that he also identifies the selection of mirror substrate materials which exhibit a thermal conductivity peak at the cryogenic temperature range. More particularly, copper, diamond, sapphire and silicon are suitable substrate materials, with sapphire appearing to have the most favorable thermal conductivity and coefficient of thermal expansion characteristics in a cryogenic temperature operating range.

Figure 2:
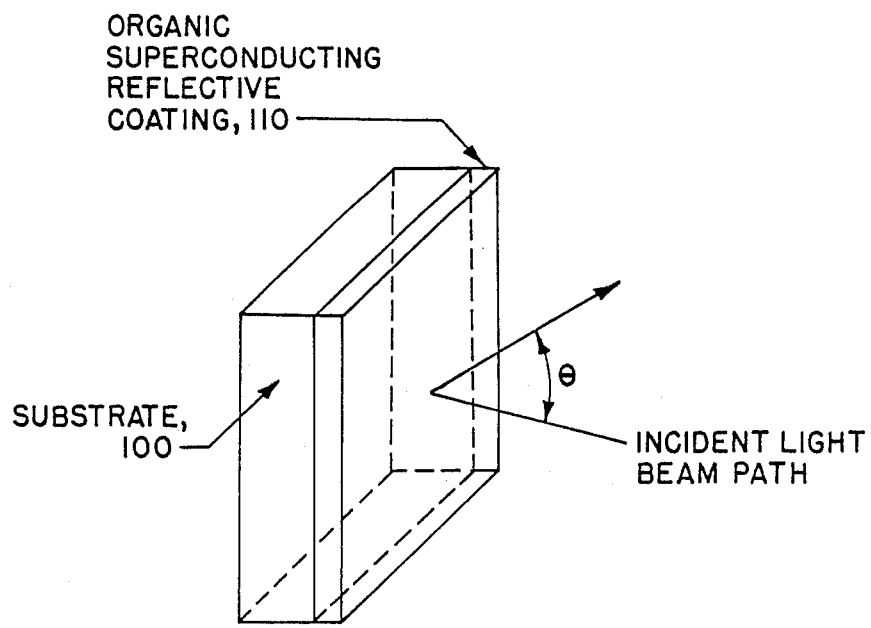
FIG. 2 is an illustration of the preferred embodiment of the present invention.

FIG. 2 is an illustration of an embodiment of the present invention. The optical mirror of FIG. 2 is composed of a substrate material 100 upon which an adhering organic superconducting material 110 is deposited to form a reflecting surface. The term "superconducting" is used herein to denote that the mirror is intended to be used while refrigerated to temperatures near absolute zero or 0° K. Like the Barnes, Jr. reference, such superconductivity is approached by cooling to cryogenic temperatures and below (less than 100° K.).

The optical mirror of FIG. 2 uses a superconductive organometallic substance as the reflective coating of the mirror. Broadly speaking, organometallic compounds are compounds which have a direct union of carbon with a metal. There is no agreement in the art on the definition of a metal. To some, most of the elements are very largely metallic to such an extent that, of the known elements, 68, or 74 percent of the total, are metals; 11 of the remainder or 12 percent of all the elements have some of the properties of metals (B, C, Si, P, As, Sb, Se, Te, Po, I, and element 85); and only 13 elements are non-metals (H, N, O, S, F, Cl, Br, He, Ne, A, Kr, Xe, Rn). The organic chemist would prefer to delimit the "somewhat metallic" elements to exclude at least phosphorus, selenium, and iodine; and he would wisely elect to consider carbon in organic compounds as a non-metal, if only to avoid classifying practically all organic compounds as organometallic compounds.

There are numerous types of organometallic compounds. Those having but one metal may contain one or more R groups and one or more X groups, depending on the valance of the metal and the stabilities of the organometallic compounds: $C_2H_5Na$, $(CH_3)_3Al$, $CH_3HgC_6H_5$, $C_6H_5BeCl$, $(C_6H_{11})_2PbBr_2$, $CH_3SnCl_3$. The R group can be aliphatic, alicyclic, or aromatic, and although it may have a wide variety of substituents obviously cannot contain a substituent which can react with the selected organometallic linkage.

Returning to the embodiment of FIG. 2, the substrate material 100 has a thickness measured in centimeters. This substrate is best composed of: silicon, copper, diamond or sapphire, as suggested by Barnes, Jr.

The reflective coating 110 has a thickness of only a few microns, and is composed of an organic superconducting material. The organometallic compounds all tend to be good conductors at room temperatures and make suitable super conductive reflective coatings when applied to substrates which have favorable thermal conductivities and coefficients of thermal expansion. Together, the reflective coating 110 and substrate 100 has increased mirror reflectivity and decreased thermal distortions when maintained at superconductive or cryogenic temperatures.

Superconductive and cryogenic refrigeration systems are deemed to be known in the art, and need not be described in detail here. The Barnes, Jr. reference includes an excellent summary of satisfactory coolant candidates as well as a description of refrigeration systems which would be suitable for use with the present invention. In operation, the mirror substrate and especially the reflective coating should be cooled below 100° K.

The present invention specifies that the reflective coating is an organic superconducting material. These can include halides of Group VIII metals, including hydrides, carbides, and carbonyls. Other suitable candidates would be iron halides and organoaluminum. Similarly organozinc compounds such as alkylzinc and diarylzinc compounds are suitable reflectors when cooled to superconductive temperatures.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. In a combination having a refrigeration system which cools objects in its immediate proximity to cryogenic and superconductive temperatures, an optical mirror comprising:
    a substrate which is fixed in proximity with and cooled by said refrigeration system; and
    an organic superconductive reflective coating which is deposited upon said substrate to provide a reflective mirror surface, said organic superconductive reflective coating being cooled to cryogenic and superconductive temperatures by said refrigeration system to provide reduced thermal distortion to said optical mirror.

2. An optical mirror, as defined in claim 1, wherein said organic superconductive reflective coating is a few microns in thickness, and is composed of organometallic compounds which are cooled to superconductive temperatures by said refrigeration system.

3. An optical mirror, as defined in claim 2, wherein said organic superconductive reflective coating is composed of halide compounds of Group VIII metals.

4. An optical mirror, as defined in claim 3, wherein said organic conductive reflective coating is constructed of a material selected from a group consisting of: hydrides; carbides; and carbonyls.

5. An optical mirror, as defined in claim 4, wherein said substrate is a few centimeters in thickness and is constructed of a material selected from a group consisting of: silicon, diamond, copper, and sapphire.

6. An optical mirror, as defined in claim 2, wherein said superconductive reflective coating is composed of organozinc compounds, including alkylzinc and diarylzinc.

7. An optical mirror, as defined in claim 2, wherein said superconductive reflective coating is composed of iron halide compounds.

8. An optical mirror, as defined in claim 2, wherein said superconductive reflective coating is composed of organoaluminum compounds.

* * * * *